US007916158B2

(12) United States Patent
Aoki et al.

(10) Patent No.: US 7,916,158 B2
(45) Date of Patent: Mar. 29, 2011

(54) IMAGE DISPLAY APPARATUS, IMAGE SIGNAL PROCESSING CIRCUIT USED THEREIN, AND METHOD OF CONTROLLING COLOR SATURATION OF IMAGE SIGNAL

(75) Inventors: Hiroshi Aoki, Yokohama (JP); Ryo Hasegawa, Yokohama (JP); Naoya Oka, Yokohama (JP); Rikiya Asaoka, Yokohama (JP); Daisuke Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 917 days.

(21) Appl. No.: 11/412,989

(22) Filed: Apr. 28, 2006

(65) Prior Publication Data
US 2006/0245017 A1 Nov. 2, 2006

(30) Foreign Application Priority Data

Apr. 28, 2005 (JP) ................................. 2005-130980

(51) Int. Cl.
*G09G 5/10* (2006.01)
*G06K 9/00* (2006.01)
*H04N 5/14* (2006.01)
(52) U.S. Cl. .................. 345/690; 382/167; 348/672
(58) Field of Classification Search .................. 345/690, 345/593, 87, 589, 596, 597; 382/167–169; 348/672, 674, 675
See application file for complete search history.

(56) References Cited

U.S. PATENT DOCUMENTS

| 6,141,047 | A | 10/2000 | Kawai et al. |
| 6,351,558 | B1* | 2/2002 | Kuwata .................. 382/168 |
| 6,965,389 | B1 | 11/2005 | Masuji et al. |
| 7,369,183 | B2* | 5/2008 | Oka et al. .................. 348/674 |
| 2001/0012399 | A1* | 8/2001 | Tohyama et al. ........... 382/167 |
| 2002/0126329 | A1 | 9/2002 | Kuwata |
| 2003/0142879 | A1 | 7/2003 | Kim |
| 2003/0189558 | A1 | 10/2003 | Aoki et al. |
| 2004/0246537 | A1* | 12/2004 | Ohyama et al. ............. 358/479 |
| 2005/0058341 | A1* | 3/2005 | Maruoka .................. 382/167 |

FOREIGN PATENT DOCUMENTS

| CN | 1429030 | 7/2003 |
| CN | 1450801 | 10/2003 |
| JP | 6-22174 | 1/1994 |
| JP | 7-184083 | 7/1995 |

(Continued)

OTHER PUBLICATIONS

Office Action issued in Japanese Patent Application No. 2005-130980 on Aug. 31, 2010.

*Primary Examiner* — Amr Awad
*Assistant Examiner* — Liliana Cerullo
(74) *Attorney, Agent, or Firm* — Antonelli, Terry, Stout & Kraus, LLP.

(57) ABSTRACT

Disclosed is an image display technique for displaying a high-quality image by an image signal of appropriate color saturation. To this end, in the invention, color histogram information is detected from a color difference signal and average brightness information or brightness histogram information from a brightness signal. Based on the detected color histogram information and average brightness information or brightness histogram information, the demodulation axis of a color difference signal is adjusted, thereby controlling the color saturation (chroma) of an image. This enables display of an image having color intensity suited to the brightness and chroma of an image signal.

14 Claims, 12 Drawing Sheets

FOREIGN PATENT DOCUMENTS

| | | |
|---|---|---|
| JP | 9-84043 | 3/1997 |
| JP | 10-210299 | 8/1998 |
| JP | 11-285019 | 10/1999 |
| JP | 2000-039862 | 2/2000 |
| JP | 2000-39862 | 2/2000 |
| JP | 2001-119715 | 4/2001 |
| JP | 2001-230941 | 8/2001 |
| JP | 2004-241882 | 8/2004 |

\* cited by examiner

FIG.5A (LIGHTEN COLOR)

| APL | COLOR HST (LARGE AMPLITUDE PART) | CONTROL |
|---|---|---|
| HIGH | LOW | NO CONTROL |
| | HIGH | NO CONTROL |
| MIDDLE | LOW | NO CONTROL |
| | HIGH | NO CONTROL |
| LOW | LOW | LIGHTEN COLOR |
| | HIGH | NO CONTROL |

FIG.5B (DEEPEN COLOR)

| APL | COLOR HST (SMALL AMPLITUDE PART) | CONTROL |
|---|---|---|
| HIGH | LOW | NO CONTROL |
| | HIGH | DEEPEN COLOR |
| MIDDLE | LOW | NO CONTROL |
| | HIGH | NO CONTROL |
| LOW | LOW | NO CONTROL |
| | HIGH | NO CONTROL |

FIG.12A (LIGHTEN COLOR)

| BRIGHTNESS HST (LARGE AMPLITUDE PART) | COLOR HST (LARGE AMPLITUDE PART) | CONTROL |
|---|---|---|
| HIGH | LOW | NO CONTROL |
| | HIGH | NO CONTROL |
| MIDDLE | LOW | NO CONTROL |
| | HIGH | NO CONTROL |
| LOW | LOW | LIGHTEN COLOR |
| | HIGH | NO CONTROL |

FIG.12B (DEEPEN COLOR)

| BRIGHTNESS HST (LARGE AMPLITUDE PART) | COLOR HST (SMALL AMPLITUDE PART) | CONTROL |
|---|---|---|
| HIGH | LOW | NO CONTROL |
| | HIGH | DEEPEN COLOR |
| MIDDLE | LOW | NO CONTROL |
| | HIGH | NO CONTROL |
| LOW | LOW | NO CONTROL |
| | HIGH | NO CONTROL |

IMAGE DISPLAY APPARATUS, IMAGE SIGNAL PROCESSING CIRCUIT USED THEREIN, AND METHOD OF CONTROLLING COLOR SATURATION OF IMAGE SIGNAL

BACKGROUND OF THE INVENTION

1. Field of the Invention

The present invention relates to a technique for processing a digital image signal, and in particular, relates to a technique for controlling color saturation.

2. Description of the Related Art

It is well known that Japanese Patent Application Laid-Open No. 2004-241882 and Japanese Patent Application Laid-Open No. 2000-39862 describes related arts of the invention. Japanese Patent Application Laid-Open No. 2004-241882 discloses a technique for correcting the color saturation of flesh color in accordance with brightness distribution of a flesh-color portion in a one-frame image signal in order to obtain an image in which optimal flesh color is reproduced. Japanese Patent Application Laid-Open No. 2000-39862 discloses a technique for controlling the chroma of a desired hue by detecting an average picture level (average brightness level) of an input image signal in order to display an image without dull colors by eliminating reduction in chroma at low brightness levels.

SUMMARY OF THE INVENTION

In the technique described in Japanese Patent Application Laid-Open No. 2004-241882, gradation and color saturation collection is performed only on the flesh-color portion of an image signal, and no consideration is given to the correction for other colors. Further, in the technique described in Japanese Patent Application Laid-Open No. 2000-39862, chroma is increased in the case where a brightness level detected from an image signal is low (in low brightness), but chroma control in consideration of chroma information is not performed. For this reason, in the case where chroma in low brightness is high, the chroma is likely to be further increased. In this case, there is a possibility that a highly colored unnatural image is created in spite of a dark image.

The present invention provides a technique for outputting an image signal to a display unit with appropriate color saturation (chroma or color intensity) in accordance with a brightness level and a color distribution state. Further, the invention provides a technique for displaying a high-quality image having appropriate color saturation in accordance with brightness.

The invention is characterized in that brightness information and chroma histogram information (chroma histogram information) concerning chroma distribution of an inputted image signal are detected and the chroma of the image signal is controlled based on the detected brightness information and chroma histogram information. More specifically, an image display technique according to the invention is as follows. Color histogram information (chroma histogram information) is detected from a color difference signal, and average brightness level information or brightness histogram information is detected from a brightness signal. The demodulation axis adjustment of the color difference signal is controlled based on a combination of the detected color histogram information and the average brightness level (average picture level: APL) information or the brightness histogram information. Further, the demodulation-axis-adjusted signal and the brightness signal are matrix-converted, and the matrix-converted signal as an image signal of a specified color saturation is outputted to be displayed. For example, in the case of controlling the demodulation axis adjustment using color histogram information and average brightness level information, if the average brightness level is low and the incidence of a large amplitude part in the color histogram information is low or the incidence of a small amplitude part is high, demodulation axis adjustment for decreasing the color saturation of the image signal is performed. Further, for example, if the average brightness level is high and the incidence of a large amplitude part in the color histogram information is low or the incidence of a small amplitude part is high, demodulation axis adjustment for increasing the color saturation of the image signal is performed. The same applies in the case of controlling the demodulation axis adjustment using color histogram information and brightness histogram information. Furthermore, if the average brightness level is low and the incidence of a large amplitude part in the color histogram information is high, demodulation axis adjustment for decreasing the color saturation of the image signal is performed, thereby decreasing a deep color of a dark image.

More specifically, the invention provides an image display apparatus, an image signal processing circuit, and a method of controlling the color saturation of an image signal, meeting the above structural requirements.

According to the invention, the image display apparatus can generate an image signal of appropriate color saturation in accordance with a brightness level and a color distribution state and thereby display a high-quality image.

BRIEF DESCRIPTION OF THE DRAWINGS

FIGS. 5A and 5B are explanatory views of color saturation control in the image display apparatus of FIG. 1.

FIGS. 12A and 12B are explanatory views of color saturation control in the image signal processing circuit of FIG. 10.

DETAILED DESCRIPTION OF THE EMBODIMENTS

Hereinafter, embodiments that specifically show the best mode for carrying out the present invention will be described with reference to the accompanying drawings.

Figure 1:
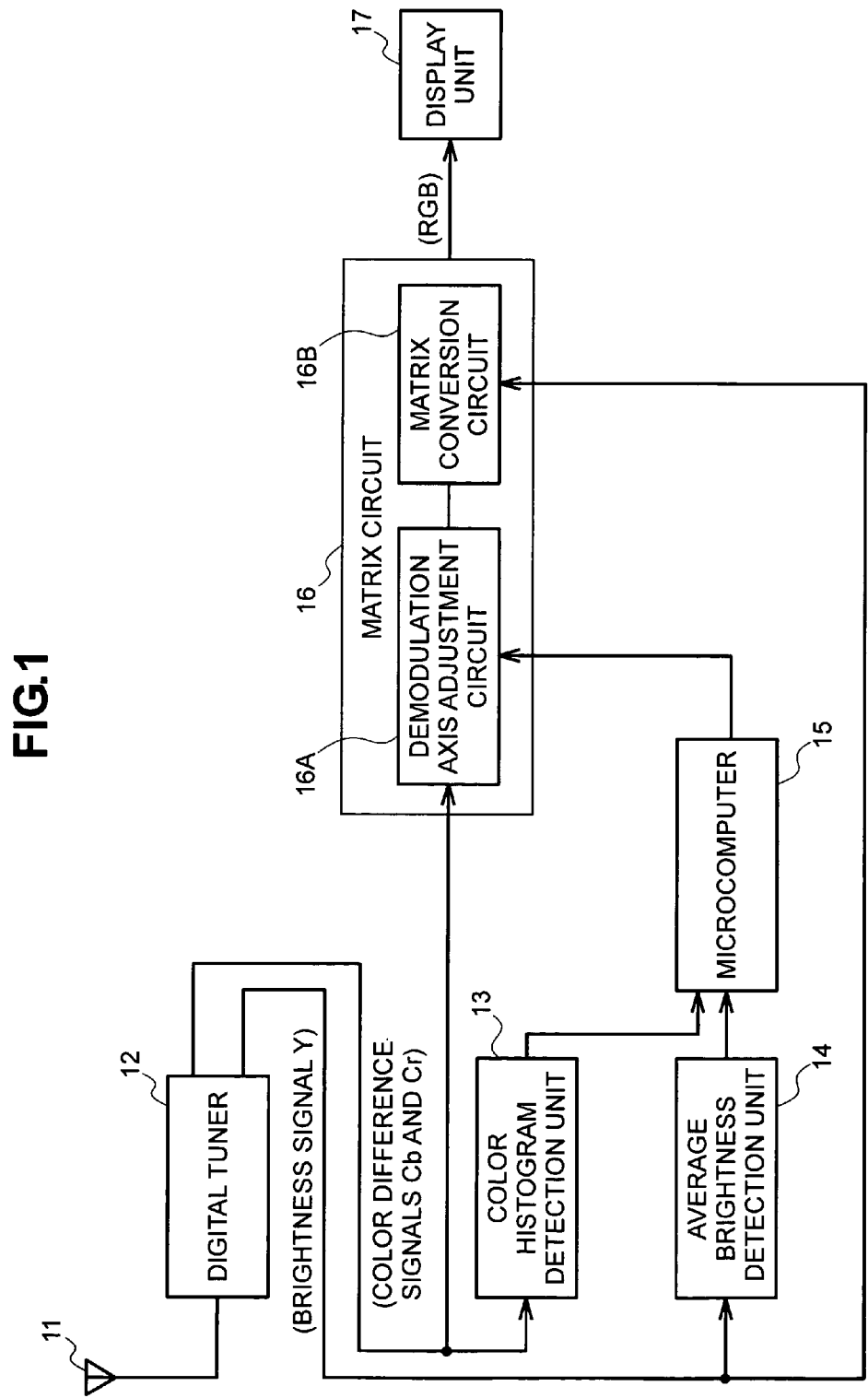
FIG. 1 is a basic block diagram of an image display apparatus according to a first embodiment of the present invention.
Figure 2:
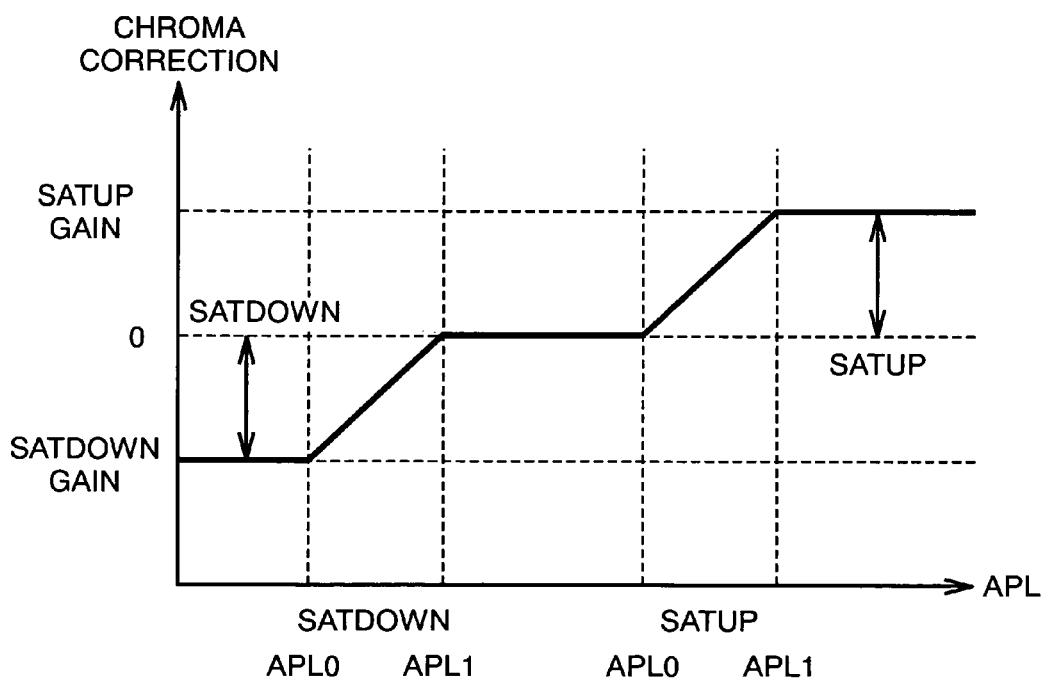
FIG. 2 is an explanatory view illustrating change in color saturation in accordance with an average brightness level in the image display apparatus of FIG. 1.
Figure 3:
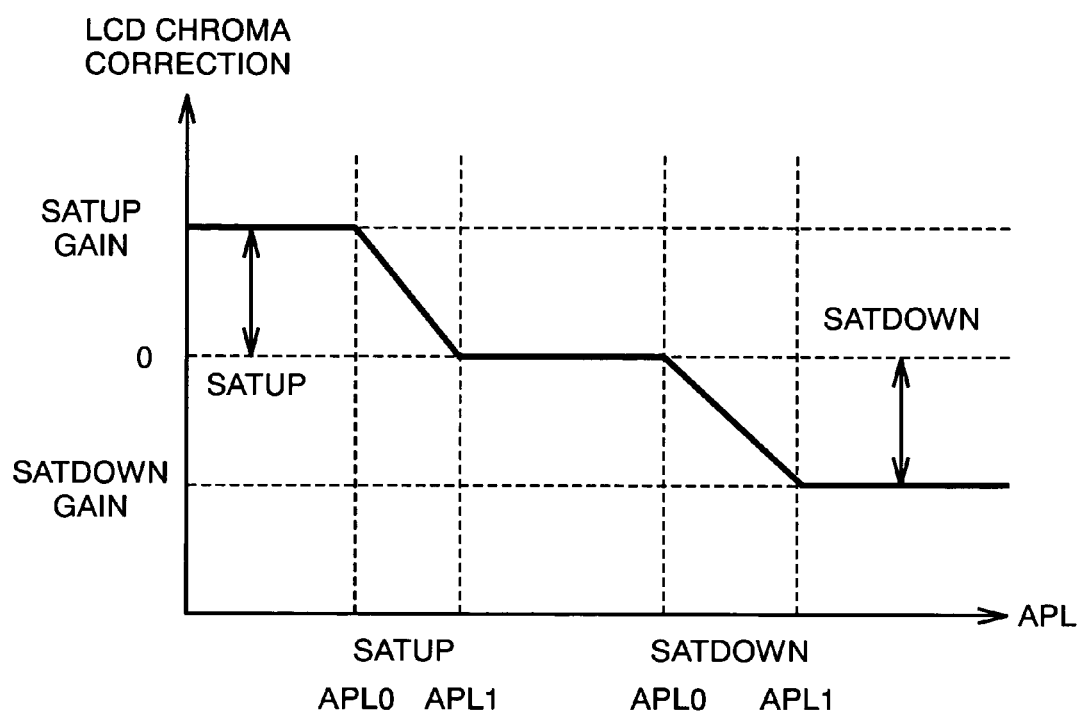
FIG. 3 is an explanatory view illustrating change in color saturation in the case where a display unit of the image display apparatus of FIG. 1 is an LCD panel.
Figure 6:
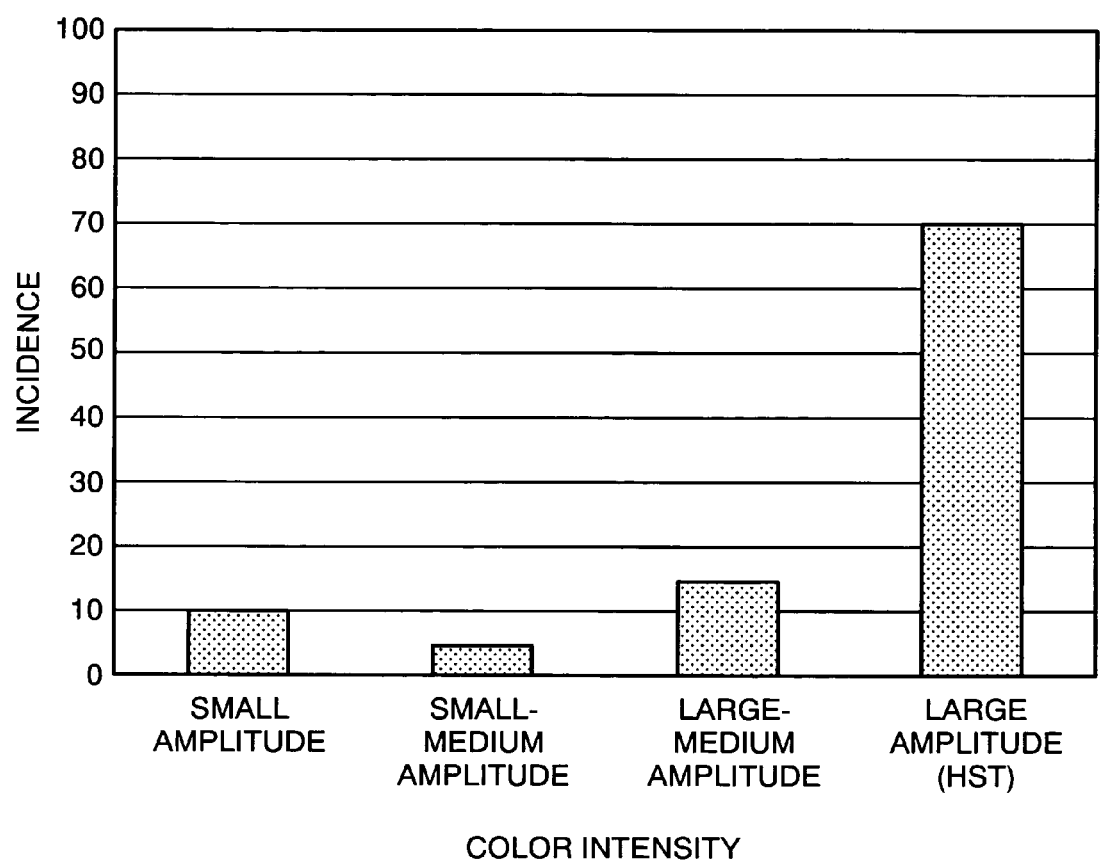
FIG. 6 is a diagram showing a detection example of color histogram information in the image display apparatus of FIG. 1.
Figure 7:
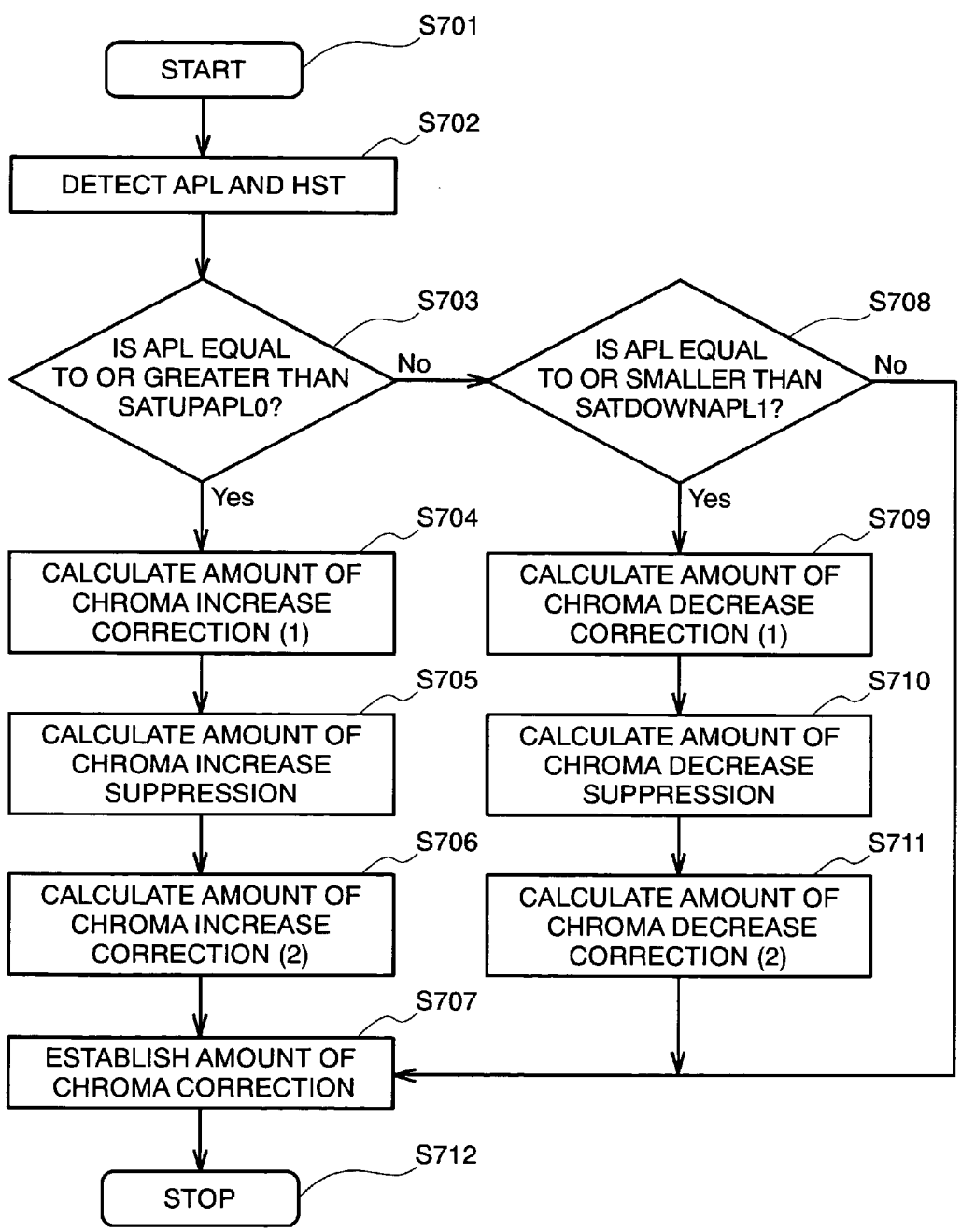
FIG. 7 is a flowchart illustrating an operation example of the color saturation correction of an image signal in the image display apparatus of FIG. 1.

FIGS. 1 to 7 are explanatory views for a first embodiment of the invention. In the first embodiment, the color saturation of an image signal is controlled based on average brightness level information and color histogram information. FIG. 1 is a basic block diagram of an image display apparatus according to the first embodiment of the invention. FIG. 2 is an explanatory view illustrating increase or decrease in color saturation of an image signal in accordance with an average brightness level (APL) in a matrix circuit of the image display apparatus in FIG. 1. FIG. 3 is an explanatory view illustrating change in color saturation in accordance with an average brightness level in the matrix circuit in the case where a display unit of the image display apparatus in FIG. 1 is an LCD panel. FIGS. 4A and 4B are explanatory views illustrating suppression of change in color saturation by color histogram information in the matrix circuit of the image display apparatus in FIG. 1. FIGS. 5A and 5B are explanatory views of color saturation control based on average brightness level information and color histogram information in the matrix circuit of the image display apparatus in FIG. 1. FIG. 6 is a diagram showing an example (detection example) of color histogram information that is detected by a color histogram detection unit of the image display apparatus in FIG. 1. FIG. 7 is a flowchart illustrating the correction operation of color saturation of an image signal in the image display apparatus in FIG. 1.

In FIG. 1, reference numeral 11 denotes an antenna, and reference numeral 12 denotes a digital tuner. A color histogram detection unit 13 detects color histogram information from inputted color difference signals Cb and Cr. An average brightness detection unit 14 detects average brightness level information from an inputted brightness signal Y. A microcomputer 15 functions as a control unit. A matrix circuit 16 to which the color difference signals Cb and Cr and the brightness signal Y are inputted, generates and outputs an image signal of specified color saturation, controlled by the microcomputer 15. A demodulation axis adjustment circuit 16a in the matrix circuit 16 performs demodulation axis adjustment of the color difference signals Cb and Cr, according to a control signal from the microcomputer 15. A matrix conversion circuit 16b in the matrix circuit 16 matrix-converts signals R-Y, R-G, and R-B formed by the demodulation axis adjustment together with the brightness signal Y. A display unit 17 displays an image based on an image signal of specified color saturation from the matrix circuit 16. In this embodiment, the demodulation axis adjustment circuit operates as a chroma adjustment unit for adjusting the chroma of an image.

The microcomputer 15 as a control unit generates a control signal for controlling the demodulation axis adjustment circuit 16a based on the detected average brightness level information and color histogram information. The demodulation axis adjustment circuit 16a controls demodulation axis adjustment operation, according to the control signal. That is, the demodulation axis adjustment circuit 16a performs demodulation axis adjustment for increasing or decreasing the color saturation of the image signal, based on the average brightness level information and the color histogram information. The brightness signal Y is inputted to the matrix conversion circuit 16b after being subjected to delay matching. The color histogram detection unit 13, the average brightness detection unit 14, the microcomputer 15, and the matrix circuit 16 constitute an image signal processing circuit. The color histogram detection unit 13 detects a histogram of color saturation, that is, a color histogram (chroma histogram) of an image signal in one frame or one field period of the image signal. Further, the average brightness detection unit 14 also detects a brightness histogram of an image signal in one frame or one field period of the image signal. In the description below, the term "color saturation" signifies "chroma" or "color intensity".

In the above configuration, the detected average brightness level and the incidence of a predetermined amplitude part in the detected color histogram information are compared with the respective reference values at the microcomputer 15. In accordance with the comparison results, the microcomputer 15 determines which of a plurality of classified ranks the input image signal falls into. For example, if the average brightness level detected by the average brightness detection unit 14 is low (low in rank) and the incidence of a large amplitude part in the color histogram information detected by the color histogram detection unit 13 is low (low in rank) or the incidence of a small amplitude part is high (high in rank), the microcomputer 15 controls the demodulation axis adjustment circuit 16a in the matrix circuit 16 so that the demodulation axis adjustment circuit 16a performs demodulation axis adjustment for decreasing the color saturation of the image signal. That is, in the above case, the microcomputer 15 performs control so as to lighten the color of the image. Further, if the average brightness level is high and the incidence of the large amplitude part in the color histogram information is low or the incidence of the small amplitude part is high, the microcomputer 15 controls the demodulation axis adjustment circuit 16a so that the demodulation axis adjustment circuit 16a performs demodulation axis adjustment for increasing the color saturation. That is, in the above case, the microcomputer 15 performs control so as to deepen the color. Furthermore, if the average brightness level detected by the average brightness detection unit 14 is low and the incidence of the large amplitude part in the color histogram information detected by the color histogram detection unit 13 is high, the microcomputer 15 controls the demodulation axis adjustment circuit 16a so that the demodulation axis adjustment circuit 16a performs demodulation axis adjustment for decreasing the color saturation of the image signal. That is, in the above case, the microcomputer 15 performs control so as to decrease the color intensity of a dark image.

In the description below, components of the apparatus in FIG. 1 are depicted by the same reference numerals as in FIG. 1. Further, in the description below, the term "color saturation" signifies "chroma" or "color intensity".

FIG. 2 is an explanatory view illustrating increase or decrease in color saturation of an image signal in accordance with an average brightness level (APL) in the matrix circuit of the image display apparatus in FIG. 1. This is an example in which color saturation is increased if an average brightness level (APL) is high, and color saturation is decreased if an average brightness level (APL) is low.

In FIG. 2, the horizontal axis indicates an average brightness level (APL), and the vertical axis indicates the amount of color saturation correction of an image signal, that is, the amount of chroma correction (gain). "SATUP" on the horizontal axis is a range where the amount of chroma correction for increasing chroma changes. That is, if APL is within range "SATUP", the amount of chroma increase correction changes in accordance with APL. "SATDOWN" is a range where the amount of chroma correction for decreasing chroma changes. That is, if APL is within range "SATDOWN", the amount of chroma decrease correction changes in accordance with APL. Further, "APL1" denotes the respective upper limits of ranges "SATUP" and "SATDOWN", and "APL0" denotes the respective lower limits of ranges "SATUP" and "SATDOWN". Furthermore, "SATUPGAIN" on the vertical axis denotes the upper limit of the amount of chroma correction, and "SATDOWNGAIN" denotes the lower limit of the amount of chroma correction. For example, if an average brightness level (APL) detected by the average brightness detection unit 14 is high and is equal to or greater than the lower limit "APL0" of range "SATUP", the microcomputer 15 calculates the amount of chroma increase correction according to the average brightness level (APL) so as to increase the chroma of the image signal. Further, if an average brightness level (APL) detected by the average brightness detection unit 14 is low and is equal to or smaller than the upper limit "APL1" of range "SATDOWN", the microcomputer 15 calculates the amount of chroma decrease correction according to the average brightness level (APL) so as to decrease the chroma of the image signal. The microcomputer 15 further corrects the results of calculating the amount of chroma increase correction and the amount of chroma decrease correction with a suppression coefficient based on color histogram information detected by the color histogram detection unit 13.

FIG. 3 is an explanatory view illustrating change in color saturation (chroma) in accordance with an average brightness level in the matrix circuit in the case where the display unit of the image display apparatus in FIG. 1 is an LCD panel. An LCD panel is prone to cause color loss if an average brightness level (APL) is low. In order to improve this, color saturation is decreased if an average brightness level (APL) is high, and color saturation is increased if an average brightness level (APL) is low.

In FIG. 3, the horizontal axis indicates an average brightness level (APL), and the vertical axis indicates the amount of color saturation correction of an image signal for an LCD panel, that is, the amount of LCD chroma correction (gain). Reference letters in FIG. 3 are the same as in FIG. 2. For example, if an average brightness level (APL) detected by the average brightness detection unit 14 is equal to or greater than the lower limit "APL0" of range "SATDOWN" as a result of determination by the microcomputer 15, the microcomputer 15 calculates the amount of chroma decrease correction according to the average brightness level (APL) so as to decrease the chroma of the image signal. Further, if an average brightness level (APL) detected by the average brightness detection unit 14 is equal to or smaller than the upper limit "APL1" of range "SATUP" as a result of determination by the microcomputer 15, the microcomputer 15 calculates the amount of chroma increase correction according to the average brightness level (APL) so as to increase the chroma of the image signal. The microcomputer 15 further corrects the results of calculating the amount of chroma decrease correction and the amount of chroma increase correction with a suppression coefficient based on color histogram information detected by the color histogram detection unit 13.

Figure 4A:
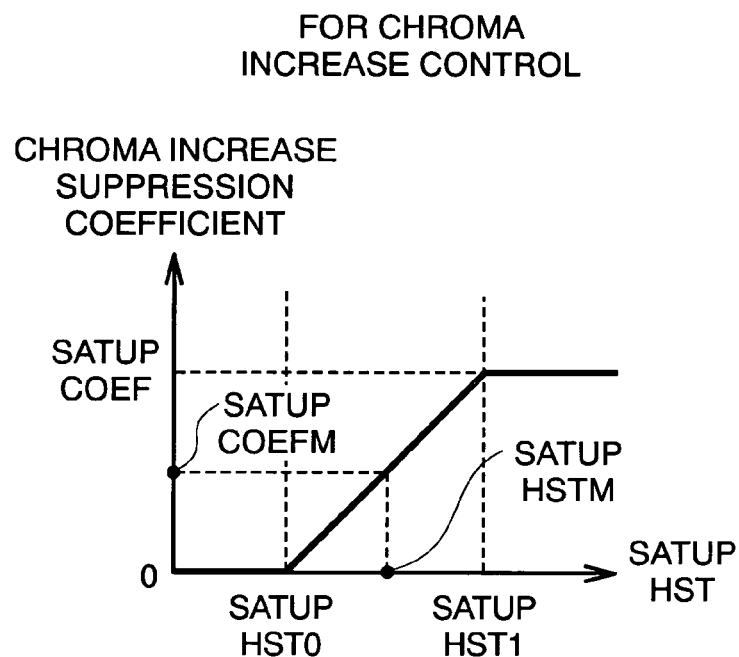
FIGS. 4A and 4B are explanatory views illustrating suppression of color saturation by color histogram information in the image display apparatus of FIG. 1.
Figure 4B:
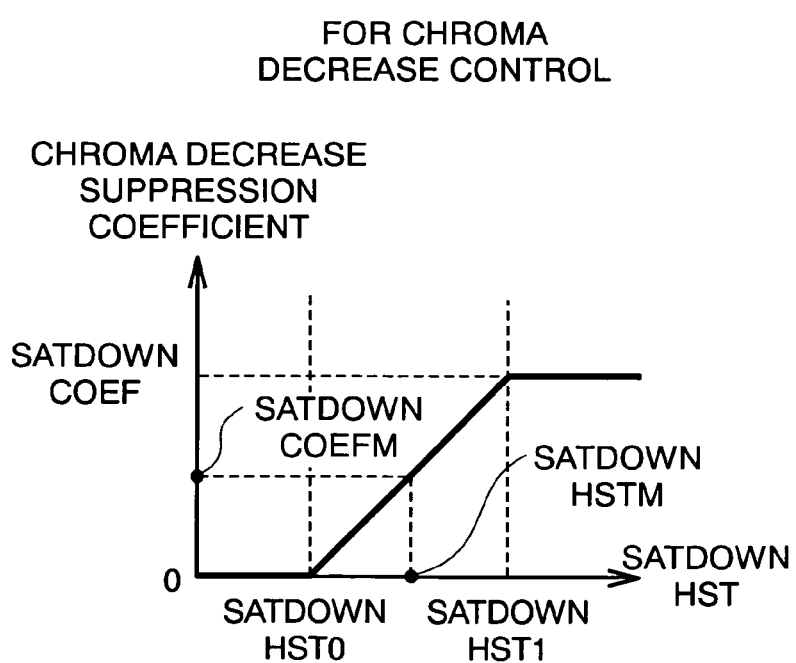

FIGS. 4A and 4B are explanatory views illustrating suppression of change in color saturation, i.e., chroma by color histogram information (chroma histogram information) in the matrix circuit of the image display apparatus in FIG. 1. FIG. 4A is a diagram showing a suppression coefficient (chroma increase suppression coefficient) in the case of suppressing increase in chroma (color saturation or color intensity). FIG. 4B is a diagram showing a suppression coefficient (chroma decrease suppression coefficient) in the case of suppressing decrease in chroma (color saturation or color intensity).

In FIGS. 4A and 4B, the horizontal axis indicates the incidence of a predetermined amplitude part in color histogram information detected by the color histogram detection unit 13, and the vertical axis indicates a suppression coefficient for suppressing change (increase or decrease) in chroma. In FIG. 4A, "SATUPHST0" on the horizontal axis is the lowest rank value, within a chroma increase suppression range, of the incidence of a predetermined amplitude part in color histogram information. "SATUPHST1" is the highest rank value, within a chroma increase suppression range, of the incidence of a predetermined amplitude part in color histogram information. Further, "SATUPCOEF" on the vertical axis is a chroma increase suppression coefficient. In FIG. 4B, "SATDOWNHST0" on the horizontal axis is the lowest rank value, within a chroma decrease suppression range, of the incidence of a predetermined amplitude part in color histogram information. "SATDOWNHST1" is the highest rank value, within a chroma decrease suppression range, of the incidence of a predetermined amplitude part in color histogram information. Further, "SATDOWNCOEF" on the vertical axis is a chroma decrease suppression coefficient.

As described in FIG. 2, for example, if an average brightness level (APL) detected by the average brightness detection unit 14 is high and is equal to or greater than the lower limit "APL0" of range "SATUP", the microcomputer 15 calculates the amount of chroma increase correction according to the average brightness level (APL) so as to increase the chroma of the image signal. The microcomputer 15 further corrects the result of calculating the amount of increase correction with a chroma increase suppression coefficient "SATUPCOEF" in FIG. 4A. For example, assume that the incidence of a predetermined amplitude part in color histogram information detected by the color histogram detection unit 13 is a rank value "SATUPHSTM" between the lowest rank "SATUPHST0" and the highest rank "SATUPHST1". In this case, the microcomputer 15 corrects the result of calculating the amount of chroma increase correction with a chroma increase suppression coefficient "SATUPCOEFM" corresponding to the rank value "SATUPHSTM", thus obtaining the final amount of chroma increase correction. The correction is performed, for example, by multiplying the result of calculating the amount of increase correction "SATUP" by the chroma increase suppression coefficient "SATUPCOEFM". The microcomputer 15 establishes the obtained final amount of chroma increase correction as the amount of chroma correction.

Further, as described in FIG. 2, for example, if an average brightness level (APL) detected by the average brightness detection unit 14 is low and is equal to or smaller than the upper limit "APL1" of range "SATDOWN", the microcomputer 15 calculates the amount of chroma decrease correction according to the average brightness level (APL) so as to decrease the chroma of the image signal. The microcomputer 15 further corrects the result of calculating the amount of decrease correction with a chroma decrease suppression coefficient "SATDOWNCOEF" in FIG. 4B. For example, assume that the incidence of a predetermined amplitude part in color histogram information detected by the color histogram detection unit 13 is a rank value "SATDOWNHSTM" between the lowest rank "SATDOWNHST0" and the highest rank "SATDOWNHST1". In this case, the microcomputer 15 corrects the result of calculating the amount of chroma decrease correction with a chroma decrease suppression coefficient "SATDOWNCOEFM" corresponding to the rank value "SAT- DOWNHSTM", thus obtaining the final amount of chroma decrease correction. The correction is performed, for example, by multiplying the result of calculating the amount of decrease correction "SATDOWN" by the chroma decrease suppression coefficient "SATDOWNCOEFM". The microcomputer 15 establishes the obtained final amount of chroma decrease correction as the amount of chroma correction.

FIGS. 5A and 5B are explanatory views of color saturation (chroma) control by the microcomputer 15 based on average brightness level information and color histogram information in the matrix circuit 16 of the image display apparatus in FIG. 1. FIG. 5A shows a state of chroma control in the case of lightening a color by decreasing the color saturation (chroma). FIG. 5B shows a state of chroma control in the case of deepening a color by increasing the color saturation (chroma). An average brightness level (APL) detected by the average brightness detection unit 14 is classified into three ranks of a high rank, a middle rank, and a low rank by the microcomputer 15. Further, the respective incidences of a large amplitude part and a small amplitude part in color histogram information detected by the color histogram detection unit 13 are classified into two ranks of a high rank and a low rank. As shown in FIG. 5A, if an average brightness level (APL) is high or middle in rank, the microcomputer 15 does not perform color saturation (chroma) control, whether the incidence of a large amplitude part in color histogram information is low or high in rank (i.e., irrespective of the color histogram information). On the other hand, if an average brightness level (APL) is low in rank and the incidence of a large amplitude part in color histogram information is low in rank (almost achromatic color), the microcomputer 15 controls the demodulation axis adjustment circuit 16a so that the demodulation axis adjustment circuit 16a performs demodulation axis adjustment to decrease the color saturation (chroma), i.e., lighten the color. Further, as shown in FIG. 5B, if an average brightness level (APL) is middle or low in rank, the microcomputer 15 does not perform color saturation (chroma) control, whether the incidence of a small amplitude part in color histogram information is low or high in rank (i.e., irrespective of the color histogram information). On the other hand, if an average brightness level (APL) is high in rank and the incidence of a small amplitude part in color histogram information is high in rank (deep color), the microcomputer 15 controls the demodulation axis adjustment circuit 16a so that the demodulation axis adjustment circuit 16a performs demodulation axis adjustment to increase the color saturation (chroma), i.e., deepen the color.

Further, if an average brightness level (APL) is low in rank and the incidence of a small amplitude part in color histogram information is high in rank, the microcomputer 15 also performs control so as to decrease the color saturation (chroma), i.e., lightening the color. Furthermore, if an average brightness level (APL) is high in rank and the incidence of a large amplitude part in color histogram information is low in rank, the microcomputer 15 also performs control so as to increase the color saturation (chroma), i.e., deepening the color.

FIG. 6 shows an example of color histogram information that is detected by the color histogram detection unit 13 of the image display apparatus in FIG. 1. As shown in FIG. 6, a color saturation level, i.e., a chroma level is divided into a plurality of regions. In FIG. 6, a chroma level is divided into four chroma level regions of small amplitude, small-medium amplitude, large-medium amplitude, and large amplitude. Further, in one screen period (one frame period or one field period), the respective incidences, i.e., the respective numbers of pixels that fall into the four level (amplitude) regions are detected from color difference signals, thereby forming a color histogram as illustrated. This enables the grasping of chroma distribution (color saturation distribution or color intensity distribution) per screen. This color histogram is an example for a deep color, where the incidence of a large amplitude part is high in rank and the incidence of a small amplitude part is low in rank. In the image display apparatus according to the first embodiment, based on the color histogram information the microcomputer 15 controls the demodulation axis adjustment circuit 16a in the matrix circuit 16 so that the matrix circuit 16 generates and outputs an image signal of specified color saturation (chroma).

FIG. 7 is a flowchart illustrating an operation example of the correction control by the microcomputer 15 of color saturation (chroma) of an image signal in the image display apparatus in FIG. 1. This operation example corresponds to the control characteristics shown in FIG. 2.

As shown in FIG. 7, the color saturation control process according to this embodiment contains the following steps.

(1) The microcomputer 15 starts an operation of correction control of image signal color saturation (chroma) (step S701).

(2) The average brightness detection unit 14 detects average brightness level (APL) information from a brightness signal Y, and the color histogram detection unit 13 detects color histogram. information from color difference signals Cb and Cr (step S702). The microcomputer 15 classifies the detected average brightness level information and the incidence of a predetermined amplitude part in the detected color histogram information.

(3) The microcomputer 15 determines whether the detected average brightness level (APL) is equal to or greater than the lower limit "APL0" of threshold "SATUP" (step S703).

(4) If the average brightness level (APL) is equal to or greater than the lower limit "APL0" of threshold "SATUP" as a result of the determination at step S703, the microcomputer 15 calculates the amount of chroma increase correction according to the average brightness level (APL) so as to increase the chroma of the image signal (step S704).

(5) The microcomputer 15 obtains the amount of chroma increase suppression (chroma increase suppression coefficient) by calculation, based on the incidence rank of the predetermined amplitude part in the color histogram information (step S705).

(6) The microcomputer 15 corrects the amount of chroma increase correction obtained at step S704 with the chroma increase suppression coefficient obtained at step S705 to newly obtain the amount of chroma increase correction (step S706).

(7) The microcomputer 15 establishes the amount of chroma increase correction obtained at step S706 as the amount of chroma correction (step S707). Thereafter, the microcomputer 15 stops the operation of correction control of image signal color saturation (chroma) (step S712).

(8) If the detected average brightness level (APL) is not equal to or greater than the lower limit "APL0" of threshold "SATUP" as a result of the determination at step S703, the microcomputer 15 determines whether the average brightness level (APL) is equal to or smaller than the upper limit "APL1" of threshold "SATDOWN" (step S708)

(9) If the average brightness level (APL) is equal to or smaller than the upper limit "APL1" of threshold "SATDOWN" as a result of the determination at step S708, the microcomputer 15 calculates the amount of chroma decrease correction according to the average brightness level (APL) so as to decrease the chroma of the image signal (step S709).

(10) The microcomputer 15 obtains the amount of chroma decrease suppression (chroma decrease suppression coefficient) by calculation, based on the incidence rank of the predetermined amplitude part in the color histogram information (step S710).

(11) The microcomputer 15 corrects the amount of chroma decrease correction obtained at step S709 with the chroma decrease suppression coefficient obtained at step S710 to newly obtain the amount of chroma decrease correction (step S711).

(12) The microcomputer 15 establishes the new amount of chroma decrease correction obtained at step S711 as the amount of chroma correction (step S707). Thereafter, the microcomputer 15 stops the operation of correction control of image signal color saturation (chroma) (step S712).

(13) If the average brightness level (APL) is not equal to or smaller than the upper limit "APL1" of threshold "SATDOWN" as a result of the determination at step S708, the microcomputer 15 performs the operation of step S707 to establish the amount of chroma correction.

A series of correction control operations in the above items (1) to (13) is automatically performed by the microcomputer 15 according to a program. The program is stored in a memory beforehand in the microcomputer 15 or another memory (not shown) in the image display apparatus.

Figure 8:
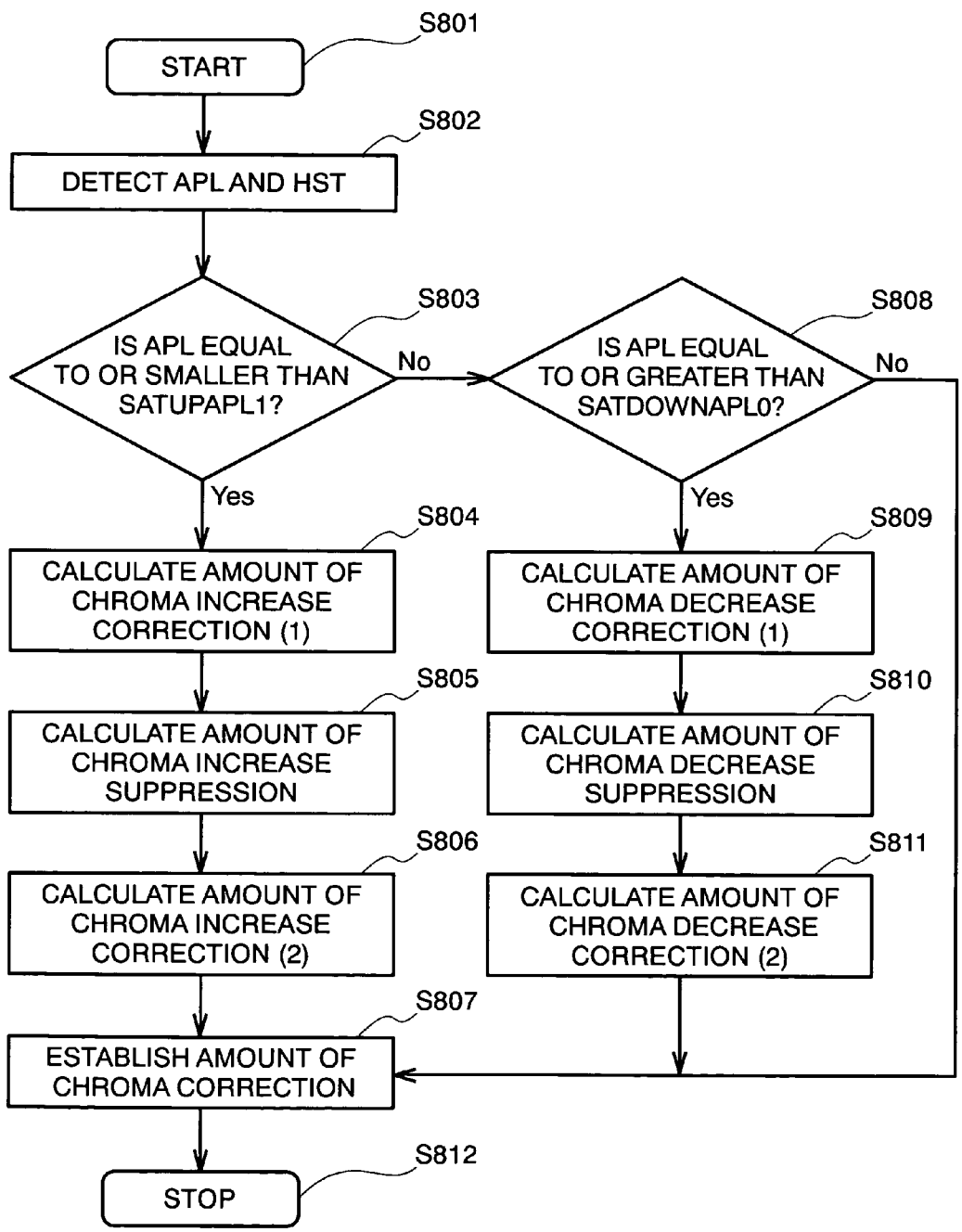
FIG. 8 is a flowchart illustrating another operation example of the color saturation correction of an image signal in the image display apparatus of FIG. 1.

FIG. 8 is a flowchart illustrating another operation example of the correction control by the microcomputer 15 of color saturation (chroma) of an image signal in the image display apparatus in FIG. 1. This correction control operation is performed especially in the case where the display unit 17 is an LCD panel, and corresponds to the control characteristics shown in FIG. 3. The flow of the operation will be described below.

As shown in FIG. 8, the color saturation control process according to this embodiment contains the following steps.

(1) The microcomputer 15 starts an operation of correction control of image signal color saturation (chroma) (step S801).

(2) The average brightness detection unit 14 detects average brightness level (APL) information from a brightness signal Y, and the color histogram detection unit 13 detects color histogram information from color difference signals Cb and Cr (step S802). The microcomputer 15 classifies the detected average brightness level information and the incidence of a predetermined amplitude part in the detected color histogram information.

(3) The microcomputer 15 determines whether the detected average brightness level (APL) is equal to or smaller than the upper limit "APL1" of threshold "SATUP" (step S803).

(4) If the average brightness level (APL) is equal to or smaller than the upper limit "APL1" of threshold "SATUP" as a result of the determination at step S803, the microcomputer 15 calculates the amount of chroma increase correction according to the average brightness level (APL) so as to increase the chroma of the image signal (step S804).

(5) The microcomputer 15 obtains the amount of chroma increase suppression (chroma increase suppression coefficient) by calculation, based on the incidence rank of the predetermined amplitude part in the color histogram information (step S805).

(6) The microcomputer 15 corrects the amount of chroma increase correction obtained at step S804 with the chroma increase suppression coefficient obtained at step S805 to newly obtain the amount of chroma increase correction (step S806).

(7) The microcomputer 15 establishes the amount of chroma increase correction obtained at step S806 as the amount of chroma correction (step S807). Thereafter, the microcomputer 15 stops the operation of correction control of image signal color saturation correction (chroma) (step S812).

(8) If the detected average brightness level (APL) is not equal to or smaller than the upper limit "APL1" of threshold "SATUP" as a result of the determination at step S803, the microcomputer 15 determines whether the average brightness level (APL) is equal to or greater than the lower limit "APL0" of threshold "SATDOWN" (step S808).

(9) If the average brightness level (APL) is equal to or greater than the lower limit "APL0" of threshold "SATDOWN" as a result of the determination at step S808, the microcomputer 15 calculates the amount of chroma decrease correction according to the average brightness level (APL) so as to decrease the chroma of the image signal (step S809).

(10) The microcomputer 15 obtains the amount of chroma decrease suppression (chroma decrease suppression coefficient) by calculation, based on the incidence rank of the predetermined amplitude part in the color histogram information (step S810).

(11) The microcomputer 15 corrects the amount of chroma decrease correction obtained at step S809 with the chroma decrease suppression coefficient obtained at step S810 to newly obtain the amount of chroma decrease correction (step S811).

(12) The microcomputer 15 establishes the new amount of chroma decrease correction obtained at step S811 as the amount of chroma correction (step S807). Thereafter, the microcomputer 15 stops the operation of correction control of image signal color saturation (chroma) (step S812).

(13) If the average brightness level (APL) is not equal to or greater than the lower limit "APL0" of threshold "SATDOWN" as a result of the determination at step S808, the microcomputer 15 performs the operation of step S807 to establish the amount of chroma correction.

A series of correction control operations in the above items (1) to (13) is automatically performed according to a program. The program is stored in a memory beforehand in the microcomputer 15 or another memory (not shown) in the image display apparatus.

According to the first embodiment of the invention, the image display apparatus can generate an image signal of appropriate color saturation in accordance with a brightness level and a color distribution state, thereby making it possible to display an image of high quality. In particular, since the matrix circuit 16 is so constructed as to change color intensity, it is possible to change not only the color intensity but also the gain of each of red, green, and blue, thereby enabling fine color control.

The characteristics of the control operations described above are only examples, and it is possible to control color saturation (chroma) with a variety of control characteristics. For example, in FIG. 5A, if an average brightness level (APL) is high or middle in rank and the incidence of a large amplitude part in color histogram information is high in rank, "no control" is performed. However, since such an image is bright and presents a deep color, the whole image may glare. Accordingly, in such a case, control may be performed so as to provide a softer image by "lightening color" instead of "no control" shown in FIG. 5A. The microcomputer 15 may execute a program that is appropriately selected from among programs prepared to allow the microcomputer 15 to execute operation procedures corresponding to a variety of control characteristics.

Figure 9:
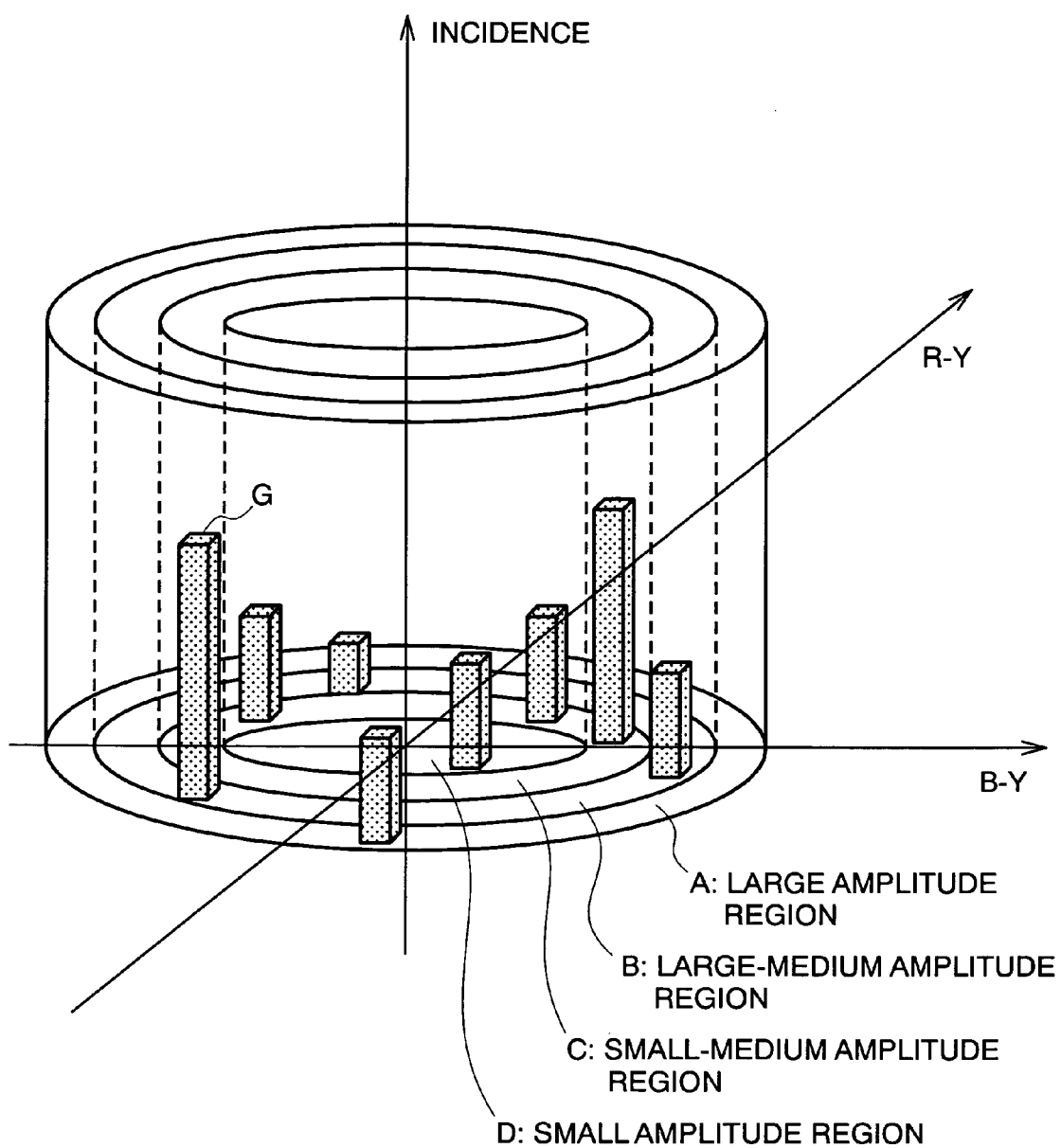
FIG. 9 is a detection example of three-dimensional color histogram information.

FIG. 9 shows another example of color histogram information that is detected by the color histogram detection unit 13 of the image display apparatus in FIG. 1. This example shows a three-dimensional color histogram provided on an amplitude region plane formed by an R-Y axis and a B-Y axis and a vertical incidence-axis. In the amplitude region plane, amplitude regions are formed concentrically about the origin point. A small amplitude region is disposed on an inner circumference side and a large amplitude region is disposed on an outer circumference side. According to this three-dimensional color histogram, by showing color intensity of each color simultaneously, it is possible to identify a color whose color saturation (chroma) should be corrected and grasp the amount of control thereof accurately in a short time, thus making it possible to improve control performance and thereby enhance image quality. For example, in FIG. 9, G indicates the green component of the color histogram in a large-medium amplitude region (B). In the case where control is performed so as to decrease extremely high color saturation (chroma or color intensity) of the green of the image, the green is brought into balance with other color components, thus making it possible to display a brilliant image. Particularly, in the structure in which the matrix circuit 16 controls color intensity based on this three-dimensional color histogram information, the control of each color component as described is easy to perform, and it also becomes possible to control a desired hue.

Figure 10:
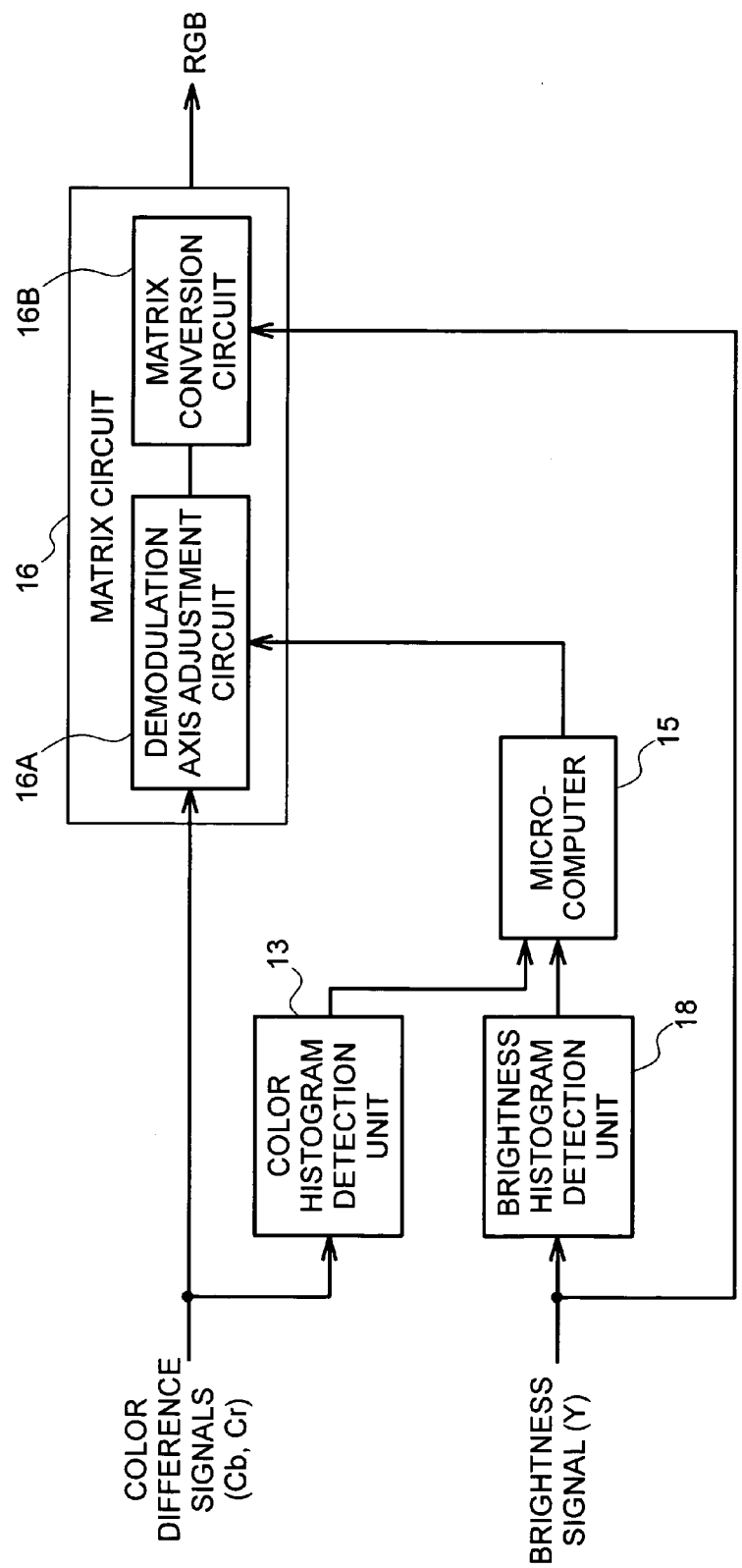
FIG. 10 is a block diagram of an image signal processing circuit constituting an image display apparatus according to a second embodiment of the invention.
Figure 11:
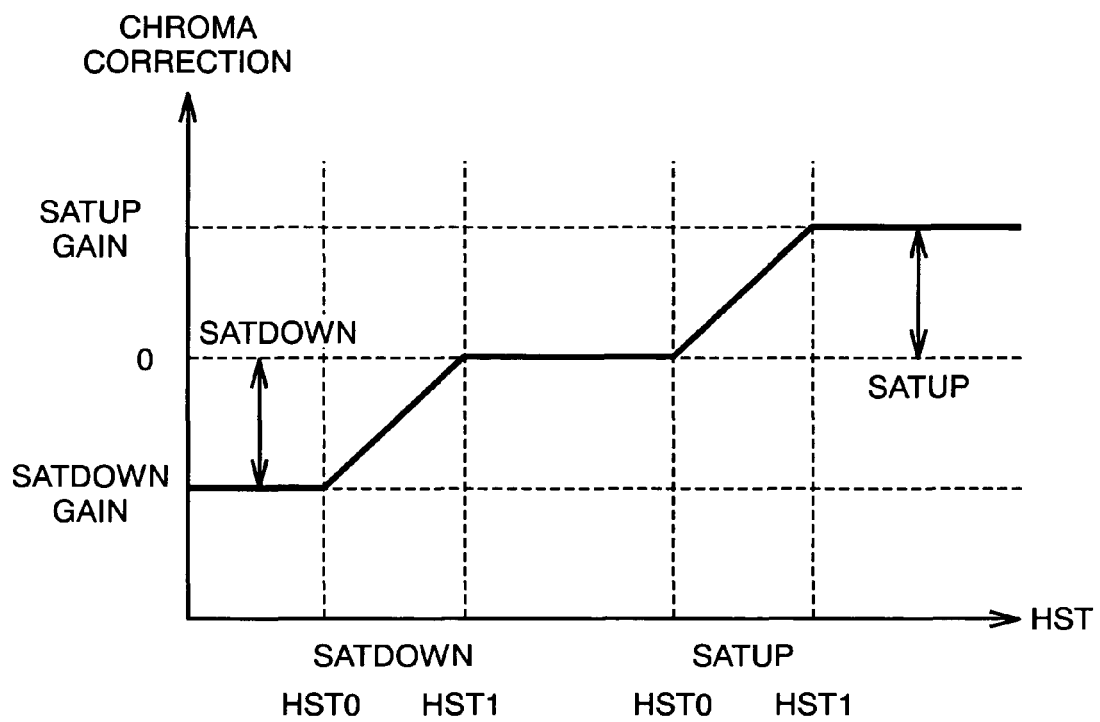
FIG. 11 is an explanatory view illustrating change in color saturation in accordance with brightness histogram information in the image signal processing circuit of FIG. 10.

FIGS. 10 to 12 are explanatory views for a second embodiment of the invention. In the second embodiment, the color saturation of an image signal is controlled based on brightness histogram information and color histogram information. FIG. 10 is a block diagram of an image signal processing circuit constituting an image display apparatus according to the second embodiment of the invention. FIG. 11 is an explanatory view illustrating increase or decrease in color saturation of an image signal in accordance with brightness histogram information in a matrix circuit of the image signal processing circuit in FIG. 10. FIGS. 12A and 12B are explanatory views of color saturation control based on brightness histogram information and color histogram information in the matrix circuit of the image signal processing circuit in FIG. 10.

In FIG. 10, a brightness histogram detection unit 18 detects brightness histogram information from a brightness signal Y. The other components are the same as in the first embodiment shown in FIG. 1. The microcomputer 15 generates a control signal for controlling the demodulation axis adjustment circuit 16a based on the detected brightness histogram information and color histogram information. The demodulation axis adjustment circuit 16a controls demodulation axis adjustment operation, according to the control signal. That is, the demodulation axis adjustment circuit 16a performs demodulation axis adjustment for increasing or decreasing the color saturation of the image signal, based on the brightness histogram information and the color histogram information.

In the above configuration, the incidence of a predetermined amplitude part in the detected brightness histogram information and the incidence of a predetermined amplitude part in the detected color histogram information are compared with the respective reference values at the microcomputer 15. In accordance with the comparison results, the microcomputer 15 determines which of a plurality of classified ranks the input image signal falls into. For example, if the incidence of the predetermined amplitude part in the brightness histogram detected by the brightness histogram detection unit 18 is low (low in rank) and the incidence of a large amplitude part in the color histogram information detected by the color histogram detection unit 13 is low (low in rank) or the incidence of a small amplitude part is high (high in rank), the microcomputer 15 controls the demodulation axis adjustment circuit 16a in the matrix circuit 16 so that the demodulation axis adjustment circuit 16a performs demodulation axis adjustment for decreasing the color saturation (color intensity or chroma) of the image signal. That is, in the above case, the microcomputer 15 performs control so as to lighten the color of the image. Further, if the incidence of the predetermined amplitude part in the brightness histogram is high (high in rank) and the incidence of the large amplitude part in the color histogram information is low or the incidence of the small amplitude part is high, the microcomputer 15 controls the demodulation axis adjustment circuit 16a so that the demodulation axis adjustment circuit 16a performs demodulation axis adjustment for increasing the color saturation. That is, in the above case, the microcomputer 15 performs control so as to deepen the color. Furthermore, if the incidence of the predetermined amplitude part in the brightness histogram detected by the brightness histogram detection unit 18 is low and the incidence of the large amplitude part in the color histogram information detected by the color histogram detection unit 13 is high, the microcomputer 15 controls the demodulation axis adjustment circuit 16a so that the demodulation axis adjustment circuit 16a performs demodulation axis adjustment for decreasing the color saturation of the image signal. That is, in the above case, the microcomputer 15 performs control so as to decrease the color intensity of a dark image.

FIG. 11 is an explanatory view illustrating increase or decrease in color saturation (chroma or color intensity) of an image signal in accordance with brightness histogram information in the matrix circuit 16 of the image signal processing circuit in FIG. 10. This is an example in which color saturation is increased if the incidence of a predetermined amplitude part in a brightness histogram is high and color saturation is decreased if the incidence is low.

In FIG. 11, the horizontal axis indicates the incidence rank (HST) of a predetermined amplitude part in a brightness histogram, and the vertical axis indicates the amount of color saturation correction of an image signal, that is, the amount of chroma correction (gain). "SATUP" on the horizontal axis is a range where the amount of chroma correction for increasing chroma changes. That is, if the incidence rank of the predetermined amplitude part is within range "SATUP", the amount of chroma increase correction changes in accordance with the incidence rank. Further, "SATDOWN" is a range where the amount of chroma correction for decreasing chroma changes. That is, if the incidence rank of the predetermined amplitude part is within range "SATDOWN", the amount of chroma decrease correction changes in accordance with the incidence rank. "HST1" denotes the respective upper limits of ranges "SATUP" and "SATDOWN", and "HST0" denotes the respective lower limits of ranges "SATUP" and "SATDOWN". Further, "SATUPGAIN" on the vertical axis denotes the upper limit of the amount of chroma correction, and "SATDOWNGAIN" denotes the lower limit of the amount of chroma correction. For example, if the incidence rank (HST) of the predetermined amplitude part in a brightness histogram detected by the brightness histogram detection unit 18 is high and is equal to or greater than the lower limit "HST0" of range "SATUP", the microcomputer 15 calculates the amount of chroma increase correction according to the incidence rank (HST) so as to increase the chroma of the image signal. Further, if the incidence rank (HST) of the predetermined amplitude part in a brightness histogram detected by the brightness histogram detection unit 18 is low and is equal to or smaller than the upper limit "HST1" of range "SATDOWN", the microcomputer 15 calculates the amount of chroma decrease correction according to the incidence rank (HST) so as to decrease the chroma of the image signal. The microcomputer 15 further corrects the results of calculating the amount of chroma increase correction and the amount of chroma decrease correction with a suppression coefficient based on color histogram information detected by the color histogram detection unit 13.

The operation procedure of correction control of image signal color saturation based on brightness histogram information and color histogram information described above follows the operation procedure (FIG. 7) based on average brightness level information and color histogram information in the first embodiment and will be briefly described below. The color saturation control process according to this embodiment contains the following steps.

(1) The microcomputer 15 starts an operation of correction control of image signal color saturation (chroma).

(2) The brightness histogram detection unit 18 detects brightness histogram information from a brightness signal Y, and the color histogram detection unit 13 detects color histogram information from color difference signals Cb and Cr. The microcomputer 15 classifies the incidence of a predetermined amplitude part in the detected brightness histogram information and the incidence of a predetermined amplitude part in the detected color histogram information.

(3) The microcomputer 15 determines whether the incidence rank (HST) of the predetermined amplitude part in the detected brightness histogram is equal to or greater than the lower limit "HST0" of threshold "SATUP".

(4) If the incidence rank (HST) is equal to or greater than the lower limit "HST0" of threshold "SATUP" as a result of the above determination, the microcomputer 15 calculates the amount of chroma increase correction according to the incidence rank (HST) of the predetermined amplitude part in the brightness information so as to increase the chroma of the image signal.

(5) The microcomputer 15 obtains the amount of chroma increase suppression (chroma increase suppression coefficient) by calculation, based on the incidence rank of the predetermined amplitude part in the color histogram information.

(6) The microcomputer 15 corrects the amount of chroma increase correction with the chroma increase suppression coefficient to newly obtain the amount of chroma increase correction.

(7) The microcomputer 15 establishes the corrected amount of chroma increase correction as the amount of chroma correction. Thereafter, the microcomputer 15 stops the operation of correction control of image signal color saturation (chroma).

(8) If the incidence rank (HST) of the predetermined amplitude part in the brightness histogram is not equal to or greater than the lower limit "HST0" of threshold "SATUP" as a result of determining the detected brightness histogram, the microcomputer 15 determines whether the incidence rank (HST) of the predetermined amplitude part in the brightness histogram is equal to or smaller than the upper limit "HST1" of threshold "SATDOWN".

(9) If the incidence rank (HST) of the predetermined amplitude part in the brightness histogram is equal to or smaller than the upper limit "HST1" of threshold "SATDOWN" as a result of the above determination, the microcomputer 15 calculates the amount of chroma decrease correction according to the incidence rank (HST) of the predetermined amplitude part in the brightness histogram so as to decrease the chroma of the image signal.

(10) The microcomputer 15 obtains the amount of chroma decrease suppression (chroma decrease suppression coefficient) by calculation, based on the incidence rank of the predetermined amplitude part in the color histogram information.

(11) The microcomputer 15 corrects the amount of chroma decrease correction with the chroma decrease suppression coefficient to newly obtain the amount of chroma decrease correction.

(12) The microcomputer 15 establishes the corrected amount of chroma decrease correction as the amount of chroma correction. Thereafter, the microcomputer 15 stops the operation of correction control of image signal color saturation (chroma).

(13) If the incidence rank (HST) of the predetermined amplitude part in the brightness histogram is not equal to or smaller than the upper limit "HST1" of threshold "SATDOWN" as a result of the above determination, the microcomputer 15 establishes the amount of chroma correction.

A series of correction control operations in the above items (1) to (13) is also automatically performed according to a program. The program is stored in a memory beforehand in the microcomputer 15 or another memory (not shown) in the image display apparatus.

FIGS. 12A and 12B are explanatory views of color saturation (chroma) control based on brightness histogram information and color histogram information in the matrix circuit 16 of the image signal processing circuit in FIG. 10. FIG. 12A shows a state of chroma control in the case of lightening a color by decreasing the color saturation (chroma). FIG. 12B shows a state of chroma control in the case of deepening a color by increasing the color saturation (chroma). In the case of FIGS. 12A and 12B, the incidence of a large amplitude part in a brightness histogram detected by the brightness histogram detection unit 18 is classified into three ranks of a high rank, a middle rank, and a low rank by the microcomputer 15. Further, the respective incidences of a large amplitude part and a small amplitude part in color histogram information detected by the color histogram detection unit 13 are classified into two ranks of a high rank and a low rank. As shown in FIG. 12A, if the incidence of a large amplitude part in a brightness histogram is high or middle in rank, the microcomputer 15 does not perform color saturation (chroma) control, whether the incidence of a large amplitude part in color histogram information is low or high in rank (i.e., irrespective of the color histogram information). On the other hand, if the incidence of a large amplitude part in a brightness histogram is low in rank and the incidence of a large amplitude part in color histogram information is low in rank (almost achromatic color), the microcomputer 15 controls the demodulation axis adjustment circuit 16a so that the demodulation axis adjustment circuit 16a performs demodulation axis adjustment to decrease the color saturation (chroma), i.e., lighten the color. Further, as shown in FIG. 12B, if the incidence of a large amplitude part in a brightness histogram is middle or low in rank, the microcomputer 15 does not perform color saturation (chroma) control, whether the incidence of a small amplitude part in color histogram information is low or high in rank (i.e., irrespective of the color histogram information). On the other hand, if the incidence of a large amplitude part in a brightness histogram is high in rank and the incidence of a small amplitude part in color histogram information is high in rank (deep color), the microcomputer 15 controls the demodulation axis adjustment circuit 16a so that the demodulation axis adjustment circuit 16a performs demodulation axis adjustment to increase the color saturation (chroma), i.e., deepen the color.

Further, if the incidence of a large amplitude part in a brightness histogram is low in rank and, the incidence of a small amplitude part in color histogram information is high in rank, the microcomputer 15 also performs control so as to decrease the color saturation (chroma), i.e., lightening the color. Furthermore, if the incidence of a large amplitude part in a brightness histogram is high in rank and the incidence of a large amplitude part in color histogram information is low in rank, the microcomputer 15 also performs control so as to increase the color saturation (chroma), i.e., deepening the color.

The image display apparatus using the image signal processing circuit in FIG. 10 displays an image based on the image signal of the controlled color saturation (chroma) on a display unit (not shown).

According to the second embodiment as well, the image display apparatus can generate an image signal of appropriate color saturation in accordance with a brightness level and a color distribution state, thereby making it possible to display an image of high quality. It is possible to change not only color intensity but also the gain of each of red, green, and blue out of all the hues or combinations thereof, thereby enabling fine color control. That is, according to this embodiment, chroma (color intensity or color saturation) within a desired hue range such as red, green and blue can be controlled independently of the chroma of other hues. For example, in the case where an average brightness level (APL) is high, it is possible to perform control so as to enhance the chroma of blue only without controlling the chroma of green and red. Thereby, for example, in a bright image including relatively deep blue such as the sky or the sea, it is possible to display the image more beautifully by further deepening the color of the sky or the sea. Further, control may be performed so as to enhance the chroma of blue and green both independently of the chroma of other hues, or control may be performed so as to increase the chroma of blue and green and decrease the chroma of red. Thus, according to this embodiment, the color saturation of a specified or desired hue is controlled based on brightness information and color (chroma) histogram information, thereby enabling finer color adjustment.

Further, a structure for detecting a three-dimensional color histogram as shown in FIG. 9 may be used as the color histogram detection unit 13 in the second embodiment. In this case, by showing color intensity of each hue simultaneously, it is possible to accurately identify a color whose color saturation (chroma) should be corrected and grasp the amount of control thereof in a short time. These features as well as the functions of the matrix circuit 16 can improve color saturation (chroma) control performance and thereby enhance image quality. Further, it also becomes possible to control a hue.

Further, in the case where an LCD panel is used as the display unit of the image display apparatus in the second embodiment, the changing of color saturation (chroma) in accordance with brightness histogram information may be performed in the same manner as shown in FIG. 3. In this case (in the case where an LCD panel is used in the second embodiment), the operation of correction control by the microcomputer 15 of image signal color saturation (chroma) may be performed in the same manner as in FIG. 8.

Further, in the above embodiments, the microcomputer 15 is used as the control unit. However, the control unit according to the invention is not limited thereto and may be any other device. Furthermore, the display unit 17 is not particularly restricted and may be a unit using an LCD panel, a plasma display panel, a CRT, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus for controlling image quality based on an image signal comprising:
   a chroma adjustment unit which adjusts chroma of the image signal;
   a detection unit which detects color histogram information and average brightness level information from the image signal;
   a control unit which controls the chroma adjustment unit and calculates an amount of chroma adjustment based on an incidence rank of a predetermined amplitude part in the detected color histogram information, and the detected average brightness level information; and
   a display unit which displays an image based on the image signal subjected to the amount of chroma adjustment;
   wherein the control unit calculates the amount of chroma adjustment so as to decrease color saturation of the image signal when the detected average brightness level information is lower than a first predetermined value and an incidence of a large amplitude part in the detected color histogram information is lower than a second predetermined value or an incidence of a small amplitude part in the detected color histogram information is higher than the second predetermined value.

2. An image display apparatus for controlling image quality based on an image signal, comprising:
   a chroma adjustment unit which adjusts chroma of the image signal;
   a detection unit which detects color histogram information and average brightness level information from the image signal;
   a control unit which controls the chroma adjustment unit and calculates an amount of chroma adjustment based on an incidence rank of a predetermined amplitude part in the detected color histogram information, and the detected average brightness level information; and
   a display unit which displays an image based on the image signal subjected to the amount of chroma adjustment;
   wherein the control unit calculates the amount of chroma adjustment so as to increase color saturation of the image signal when the detected average brightness level information is higher than a first predetermined value and an incidence of a large amplitude part in the detected color histogram information is lower than a second predetermined value or an incidence of a small amplitude part in the detected color histogram information is higher than the second predetermined value.

3. An image display apparatus for controlling image quality based on an image signal, comprising:
   a chroma adjustment unit which adjusts chroma of the image signal;
   a detection unit which detects color histogram information and average brightness level information from the image signal;
   a control unit which controls the chroma adjustment unit and calculates an amount of chroma adjustment based on an incidence rank of a predetermined amplitude part in the detected color histogram information, and the detected average brightness level information; and
   a display unit which displays an image based on the image signal subjected to the amount of chroma adjustment;
   wherein the control unit calculates the amount of chroma adjustment so as to decrease color saturation of the image signal when the detected average brightness level information is lower than a first predetermined value and an incidence of a large amplitude part in the detected color histogram information is higher than a second predetermined value.

4. An image display apparatus for controlling image quality based on an image signal, comprising:
- a chroma adjustment unit which adjusts chroma of the image signal;
- a detection unit which detects color histogram information and brightness histogram information from the image signal;
- a control unit which controls the chroma adjustment unit and calculates an amount of chroma adjustment based on an incidence rank of a predetermined amplitude part in the detected color histogram information, and the detected brightness histogram information; and
- a display unit which displays an image based on the image signal subjected to the amount of chroma adjustment;
- wherein the control unit calculates the amount of chroma adjustment so as to decrease color saturation of the image signal when an incidence of a large amplitude part in the detected brightness histogram information unit is lower than a first determined value or an incidence of a small amplitude part in the detected brightness histogram information is higher than the first predetermined value and an incidence of a large amplitude part in the detected color histogram information is lower than a second predetermined value or an incidence of a small amplitude part in the detected color histogram information is higher than the second predetermined value.

5. An image display apparatus for controlling image quality based on an image signal, comprising:
- a chroma adjustment unit which adjusts chroma of the image signal;
- a detection unit which detects color histogram information and brightness histogram information from the image signal;
- a control unit which controls the chroma adjustment unit and calculates an amount of chroma adjustment based on an incidence rank of a predetermined amplitude part in the detected color histogram information, and the detected brightness histogram information; and
- a display unit which displays an image based on the image signal subjected to the amount of chroma adjustment;
- wherein the control unit calculates the amount of chroma adjustment so as to increase color saturation of the image signal when an incidence of a large amplitude part in the detected brightness histogram information is higher than a first predetermined value and an incidence of a large amplitude part in the detected color histogram information is lower than a second predetermined value or an incidence of a small amplitude part in the detected color histogram information is higher than the second predetermined value.

6. An image display apparatus for controlling image quality based on an image signal, comprising:
- a chroma adjustment unit which adjusts chroma of the image signal;
- a detection unit which detects color histogram information and brightness histogram information from the image signal;
- a control unit which controls the chroma adjustment unit and calculates an amount of chroma adjustment based on an incidence rank of a predetermined amplitude part in the detected color histogram information, and the detected brightness histogram information; and
- a display unit which displays an image based on the image signal subjected to the amount of chroma adjustment;
- wherein the control unit calculates the amount of chroma adjustment so as to decrease color saturation of the image signal when an incidence of a large amplitude part in the detected brightness histogram is lower than a first predetermined value or an incidence of a small amplitude part in the detected brightness histogram is higher than the first predetermined value and an incidence of a large amplitude part in the detected color histogram information is higher than a second predetermined value.

7. An image display apparatus for controlling image quality based on an image signal, comprising:
- a chroma adjustment unit which adjusts chroma of the image signal;
- a detection unit which detects color histogram information and average brightness level information from the image signal;
- a control unit which controls the chroma adjustment unit and calculates an amount of chroma adjustment based on an incidence rank of a predetermined amplitude part in the detected color histogram information, and the detected average brightness level information; and
- a display unit which displays an image based on the image signal subjected to the amount of chroma adjustment;
- wherein the display unit is an LCD panel, and
- wherein the control unit calculates the amount of chroma adjustment so as to increase color saturation of the image signal when the detected average brightness level information is lower than a first predetermined value and an incidence of the large amplitude part in the detected color histogram information is lower than a second predetermined value or an incidence of the small amplitude part in the detected color histogram information is higher than the second predetermined value.

8. An image display apparatus for controlling image quality based on an average signal, comprising:
- a chroma adjustment unit which adjusts chroma of the image signal;
- a detection unit which detects color histogram information and average brightness level information from the image signal;
- a control unit which controls the chroma adjustment unit and calculates an amount of chroma adjustment based on an incidence rank of a predetermined amplitude part in the detected color histogram information, and the detected average brightness level information; and
- a display unit which displays an image based on the image signal subjected to the amount of chroma adjustment;
- wherein the display unit is an LCD panel, and
- wherein the control unit calculates the amount of chroma adjustment so as to decrease color saturation of the image signal when the detected average brightness level information is higher than a first predetermined value and an incidence of a large amplitude part in the detected color histogram information is lower than a second predetermined value or an incidence of a small amplitude part in the detected color histogram information is higher than the second predetermined value.

9. A color saturation control method for controlling color saturation of an image signal, comprising:
- a first step of detecting color histogram information from a color difference signal contained in an image signal and detecting average brightness level information from a brightness signal contained in the image signal; and
- a second step of adjusting color saturation of the image signal by controlling the color difference signal and calculating an amount of chroma adjustment based on an incidence rank of a predetermined amplitude part in the detected color histogram information and the detected average brightness level information;

wherein in the second step, the color difference signal is controlled and the amount of chroma adjustment is calculated so that color saturation of the image signal is decreased when the detected average brightness level information is lower than a first predetermined value and an incidence of a large amplitude part in the detected color histogram information is lower than a second predetermined value or an incidence of a small amplitude part in the detected color histogram information is higher than the second predetermined value.

10. The color saturation control method according to claim 9, wherein in the second step, the amount of color saturation correction obtained based on the detected average brightness level information is corrected with a color saturation suppression coefficient obtained based on the detected color histogram information.

11. The color saturation control method according to claim 9, wherein in the second step, adjustment of the color saturation is performed on a color difference signal of a hue within a specified hue range.

12. A color saturation control method for controlling color saturation of an image signal, comprising:

a first step of detecting color histogram information from a color difference signal contained in an image signal and detecting average brightness level information from a brightness signal contained in the image signal; and a second step of adjusting color saturation of the image signal by controlling the color difference signal and calculating an amount of chroma adjustment based on an incidence rank of a predetermined amplitude part in the detected color histogram information and the detected average brightness level information;

wherein in the second step, the color difference signal is controlled and the amount of chroma adjustment is calculated so that color saturation of the image signal is increased when the detected average brightness level information is higher than a first predetermined value and an incidence of a large amplitude part in the detected color histogram information is lower than a second predetermined value or an incidence of a small amplitude part in the detected color histogram information is higher than the second predetermined value.

13. A color saturation control method for controlling color saturation of an image signal, comprising:

a first step of detecting color histogram information from a color difference signal contained in an image signal and detecting brightness histogram information from a brightness signal contained in the image signal; and a second step of adjusting color saturation of the image signal by controlling the color difference signal and calculating an amount of chroma adjustment based on an incidence rank of a predetermined amplitude part in the detected color histogram information and the detected brightness histogram information;

wherein in the second step, the color difference signal is controlled and the amount of chroma adjustment is calculated so that color saturation of the image signal is decreased when an incidence of a large amplitude part in the detected brightness histogram information is lower than a first predetermined value or an incidence of a small amplitude part in the detected brightness histogram information is higher than the first predetermined value and an incidence of a large amplitude part in the detected color histogram information is lower than a second predetermined value or an incidence of a small amplitude part in the detected color histogram information is higher than the second predetermined value.

14. A color saturation control method for controlling color saturation of an image signal, comprising:

a first step of detecting color histogram information from a color difference signal contained in an image signal and detecting brightness histogram information from a brightness signal contained in the image signal; and a second step of adjusting color saturation of the image signal by controlling the color difference signal and calculating an amount of chroma adjustment based on an incidence rank of a predetermined amplitude part in the detected color histogram information and the detected brightness histogram information;

wherein in the second step, the color difference signal is controlled and the amount of chroma adjustment is calculated so that color saturation of the image signal is increased when an incidence of a large amplitude part in the detected brightness histogram information is higher than a first predetermined value and an incidence of a large amplitude part in the detected color histogram information is lower than a second predetermined value or an incidence of a small amplitude part in the detected color histogram information is higher than the second predetermined value.

* * * * *